(12) United States Patent
Bode (10) Patent No.: US 11,334,446 B2
(45) Date of Patent: May 17, 2022

(54) BACKUP SYSTEM FOR AN OVERLAY NETWORK

(71) Applicant: Kyndryl, Inc., New York, NY (US)

(72) Inventor: Christopher C. Bode, Cary, NC (US)

(73) Assignee: Kyndryl, Inc., New York, NY (US)

( * ) Notice: Subject to any disclaimer, the term of this patent is extended or adjusted under 35 U.S.C. 154(b) by 337 days.

(21) Appl. No.: 16/702,343

(22) Filed: Dec. 3, 2019

(65) Prior Publication Data
US 2021/0165720 A1  Jun. 3, 2021

(51) Int. Cl.
*G06F 12/00* (2006.01)
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1435* (2013.01); *G06F 11/1451* (2013.01); *G06F 11/1461* (2013.01); *G06F 2009/45591* (2013.01); *G06F 2009/45595* (2013.01)

(58) Field of Classification Search
CPC ............. G06F 11/1446; G06F 11/1448; G06F 11/1451; G06F 11/1453; G06F 11/2094; G06F 11/2092; G06F 11/2089; G06F 11/2087; G06F 11/2084; G06F 11/2082; G06F 11/2079; G06F 11/2076; G06F 11/2074; G06F 11/2071; G06F 11/2069; G06F 11/2066; G06F 11/2064; G06F 11/2061; G06F 11/2058; G06F 11/2056; G06F 11/2053; G06F 11/1471; G06F 11/1469; G06F 11/1466; G06F 11/1464; G06F 11/1461; G06F 11/1458; G06F 11/1456
See application file for complete search history.

(56) References Cited

U.S. PATENT DOCUMENTS

| | | | |
|---|---|---|---|
| 9,400,741 B1 * | 7/2016 | Bono | G06F 3/0611 |
| 9,977,704 B1 | 5/2018 | Chopra et al. | |
| 10,061,660 B1 | 8/2018 | Jagannatha et al. | |
| 10,296,419 B1 | 5/2019 | Shemer et al. | |
| 2020/0089409 A1 * | 3/2020 | Ankireddypalle | G06F 11/1453 |
| 2020/0349030 A1 * | 11/2020 | Meadowcroft | G06F 11/1471 |

* cited by examiner

*Primary Examiner* — Arvind Talukdar
(74) *Attorney, Agent, or Firm* — Yee & Associates, P.C.

(57) ABSTRACT

A method, apparatus, system, and computer program product for backing up data from a virtual machine. A backup service is presented by a computer system as a storage system to the virtual machine, wherein the storage system is located outside of the virtual machine. A hypervisor for the virtual machine is instructed by the computer system to present the storage system as a virtualized storage system to the virtual machine. Data is received by the computer system from the hypervisor in which the data is stored on the virtualized storage system by a backup client performing a backup operation in the virtual machine.

20 Claims, 5 Drawing Sheets

BACKUP SYSTEM FOR AN OVERLAY NETWORK

BACKGROUND

1. Field

The disclosure relates generally to an improved computer system and, more specifically, to backing up data from an overlay network to an underlay network.

2. Description of the Related Art

Information technology infrastructures are becoming increasingly virtualized and defined by software. The trend of virtualizing components in an information technology structure has moved beyond virtualizing computing and storage resources. For example, network virtualization can be used to combine hardware and software network resources and network functionality into a single virtual machine. Entirely virtualized network spaces housing virtualized customer workloads can be a part of information technology infrastructure.

In many cases, these workloads and the components that these workloads use to perform operations can reside entirely within a virtualized network. This virtualized network can also be referred to as an overlay network. The overlay network can enable virtual machines to communicate with each other. For example, a database backend can support a multitier application with separate web or API frontend components.

In some cases, access outside of the virtual overlay network may be desirable. Current access outside of the virtual overlay network can be managed by edge devices that enforce routing and firewall rules.

SUMMARY

According to one embodiment of the present invention, a method is present for backing up data from a virtual machine. A backup service is presented by a computer system as a storage system to the virtual machine, wherein the storage system is located outside of the virtual machine. A hypervisor for the virtual machine is instructed by the computer system to present the storage system as a virtualized storage system to the virtual machine. Data is received by the computer system from the hypervisor in which the data is stored on the virtualized storage system by a backup client performing a backup operation in the virtual machine.

According to another embodiment of the present invention, a backup system comprises a computer system. The computer system presents a backup service as a storage system to a virtual machine. The storage system is located outside of the virtual machine. The computer system instructs a hypervisor for the virtual machine to present the storage system as a virtualized storage system to the virtual machine. The computer system receives data from the hypervisor in which the data is stored on the virtualized storage system by a backup client performing a backup operation in the virtual machine.

According to yet another embodiment of the present invention, a computer program product for backing up data from a virtual machine comprises a computer-readable-storage media with first program code, second program code, and third program code stored on the computer-readable storage media. The first program code is executed for presenting a backup service as a storage system to the virtual machine. The storage system is located outside of the virtual machine. The second program code is executed for instructing a hypervisor for the virtual machine to present the storage system as a virtualized storage system to the virtual machine. The third program code is executed for receiving data from the hypervisor in which the data is stored on the virtualized storage system by a backup client performing a backup operation in the virtual machine.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that backups can be performed within an overlay network. However, the illustrative embodiments recognize and take into account that it may be desirable to have a backup performed outside of the overlay network. The illustrative embodiments recognize and take into account that backup infrastructure within the overlay network does not provide an ability to replicate data off-site outside of the overlay network.

The illustrative embodiments recognize and take into account that applications such as databases can require direct interaction with a virtualized workload to leverage application-specific backup application programming interfaces (APIs) to enable required backup and recovery functionality. The illustrative embodiments recognize and take into account that this type of direct interaction may be needed with application-consistent point-in-time recoveries.

The illustrative embodiments recognize and take into account that overlay network administrators can be collected to allow backup traffic to flow in and out of the overlay network. The illustrative embodiments recognize and take into account that the reluctance can be based on a desire to minimize network flows allowed for security and to avoid overloading the throughput capacity of network virtualization edge devices. An edge device is a device that provides an entry point into a network such as a switch or a router.

Thus, the illustrative embodiments provide a method, apparatus, system, and computer program product for backing up data from a virtual machine. In one illustrative example, a backup service is presented as a physical storage resource to the virtual machine as a virtualized storage system through a hypervisor. When backup software in the virtual machine writes data to be backed up to the virtual storage system, the hypervisor passes these writes to the backup service as if the writes are being sent to a physical storage system. These writes, however, are received by the backup service.

In the illustrative example, these writes performed by the backup software in the virtual machine can leverage data in native formats of applications or encapsulated in a proprietary backup software format. The data in these writes can be processed by the backup service to perform the backup of the data for the backup software in the virtual machine to provide an off-site backup.

Figure 1:
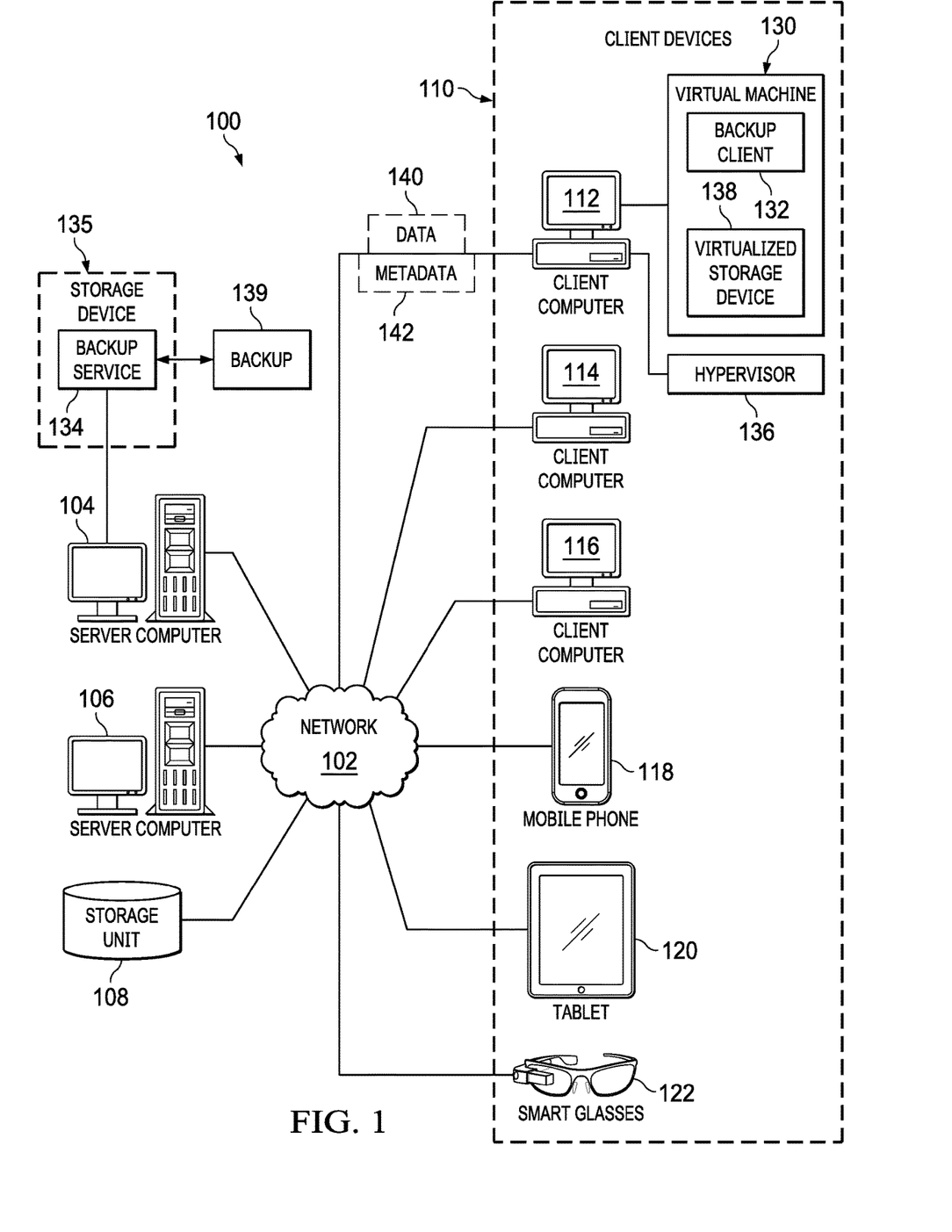
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In one illustrative example, virtual machine 130 runs on client computer 112. In this illustrative example, backup client 132 in virtual machine 130 can backup data to a physical backup system outside of virtual machine 130. As depicted, backup service 134 enables backing up data from backup client 132 without relying on edge devices in an overlay network to which virtual machine 130 may be connected.

In this illustrative example, backup service 134 is presented as storage device 135 to hypervisor 136 for virtual machine 130. In other words, backup service 134 operates to mimic storage device 135. For example, backup service 134 can be presented to hypervisor 136 as storage device 135 in the form of an Internet Protocol (IP) based storage device.

In turn, virtual machine 130 presents virtualized storage device 138 within virtual machine 130 as a virtualized form of the Internet protocol disk virtual machine 130. In this illustrative example, backup client 132 can backup data by writing data 140 to virtualized storage device 138. The writes of data 140 to virtualized storage device 138 are passed to backup service 134 by hypervisor 136. The writes are passed to backup service 134 by hypervisor 136 as writes being made to "storage device 135". In this illustrative example, these writes are passed through a path such as a storage virtualization layer rather than a network virtualization layer using an edge device.

Backup service 134 processes the writes to create backup 139. When backup 139 is completed, virtualized storage device 138 is removed from virtual machine 130. Further, backup service 134 can perform various operations on data 140 sent to backup service 134 by hypervisor 136. These operations can include providing interactions with backup client 132. The operation includes, for example, performing data de-duplication, generating responses to write requests, and other suitable operations. In this illustrative example, these operations can be performed with the aid of metadata 142. In this illustrative example, metadata 142 can be sent over an edge device, with data 140, or some combination thereof.

Figure 2:
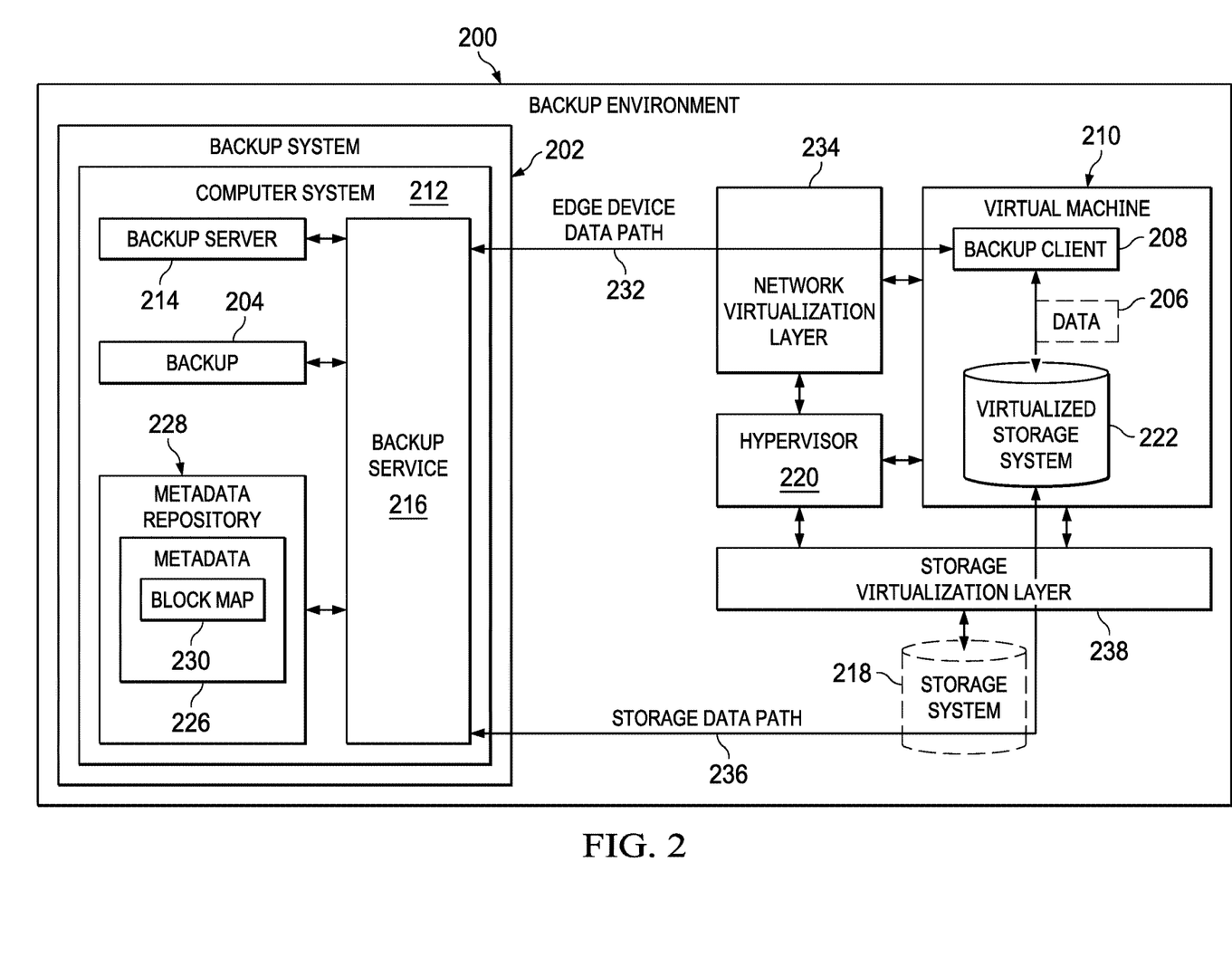
FIG. 2 is a block diagram of a backup environment in accordance with an illustrative embodiment.

With reference now to FIG. 2, a block diagram of a backup environment is depicted in accordance with an illustrative embodiment. In this illustrative example, backup environment 200 includes components that can be implemented in hardware such as the hardware shown in network data processing system 100 in FIG. 1.

In this illustrative example, backup environment 200 is an environment in which backup system 202 can create backup 204 of data 206 for backup client 208 within virtual machine 210. In this illustrative example, backup client 208 can be any program, application, or software that backs up data 206. Virtual machine 210 emulates and provides functionality of physical computing devices such as a computer, a server computer, a table computer, or some other suitable device that can process electronic data.

In this illustrative example, backup system 202 is located outside of virtual machine 210. As a result, backup 204 can be created as an off-site backup for backup client 208.

As depicted, backup system 202 comprises computer system 212, backup server 214, and backup service 216. In this illustrative example, backup server 214 and backup service 216 are located in computer system 212.

At least one of backup server 214 and backup service 216 can be implemented in software, hardware, firmware, or a combination thereof. When software is used, the operations performed by at least one of backup server 214 and backup service 216 can be implemented in program code configured to run on hardware, such as a processor unit. When firmware is used, the operations performed by at least one of backup server 214 and backup service 216 can be implemented in program code and data and stored in persistent memory to run on a processor unit. When hardware is employed, the hardware may include circuits that operate to perform the operations in at least one of backup server 214 and backup service 216.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

In this illustrative example, backup server 214 in computer system 212 presents backup service 216 as storage system 218 to virtual machine 210 in which storage system 218 is located outside of virtual machine 210. As depicted, the presentation of backup service 216 as storage system 218 can be made to hypervisor 220. In this example, hypervisor 220 can be at least one of software, firmware, or hardware that can create and run virtual machine 210.

In this depicted example, storage system 218 is shown in dotted lines to indicate that it is not a physical device, but instead represents the presentation of backup service 216 as a storage system to hypervisor 220. In other words, hypervisor 220 sees storage system 218, which is mimicked by backup service 216.

In this illustrative example, storage system 218 is a number of storage devices. For example, storage system 218 can be a single storage device. In other illustrative examples, storage system 218 can be an array of storage devices. Further, when multiple storage devices are present, the storage devices can be distributed to different locations.

As depicted, backup server 214 can initialize backup service 216 to perform backup 204 of data 206 for backup client 208. Backup server 214 can instruct hypervisor 220 for virtual machine 210 to present storage system 218 as virtualized storage system 222 to virtual machine 210. Virtualized storage system 222 can be used by various applications, programs, or other processes running within virtual machine 210.

As depicted, backup service 216 receives data 206 from hypervisor 220. Data 206 is stored on virtualized storage system 222 by backup client 208 performing a backup operation in virtual machine 210.

In this illustrative example, backup service 216 performs various operations in mimicking storage system 218, which has been presented as virtualized storage system 222 to virtual machine 210. These operations can be performed using metadata 226. As depicted, metadata 226 can be received from hypervisor 220. Metadata 226 can describe data 206 received from hypervisor 220. Metadata 226 can comprise at least one of a description of a file boundary, a modified time, a last access time, a file listing request, a directory listing request, an open file request, or other metadata relating to data 206. A file boundary, in this example, can be a description of a block in which a file is located.

Examples of operations performed using metadata 226 include determining whether data 206 has previously received and processed data 206 for a backup operation in response to data 206 not being previously received. In other words, metadata 226 can be used to form the duplication of data 206. Additionally, metadata 226 can be used to respond to a write request for data 206 from backup client 208 with a number of bytes written.

In this illustrative example, backup server 214 can maintain metadata repository 228. This repository can be used to store metadata 226. In one illustrative example, metadata 226 in metadata repository 228 can include block map 230 indicating locations of files in virtualized storage system 222.

As depicted, backup server 214 can deprovision virtualized storage system 222 when backup client 208 has completed the backup operation. This completion can be indicated through a message for indicating when data 206 was received. The message can be sent in metadata 226.

In this illustrative example, backup 204 is created without using edge device data path 232 through network virtualization layer 234 involving an edge device. Instead, backup 204 of data 206 is performed by sending data 206 using storage data path 236 though storage virtualization layer 238 to backup service 216. In this illustrative example, metadata 226 can be sent to backup service 216 through edge device data path 232. This data path can be used because metadata 226 is a smaller amount of data as compared to the amount of data 206 in backup 204. Further, this path also enables monitoring the backup workload.

In one illustrative example, one or more technical solutions are present that overcome a technical problem with backing up data to an off-site location from a virtual machine using a path from a virtual machine in an overlay network to an underlay network using an edge device. As a result, one or more technical solutions may provide a technical effect of backing up data using a storage data path to a storage virtualization layer. In the illustrative example, a backup service is presented to the virtual machine as a storage device on which data can be backed up by a backup client in the virtual machine.

Computer system 212 can be configured to perform at least one of the steps, operations, or actions described in the different illustrative examples using software, hardware, firmware, or a combination thereof. As a result, computer system 212 operates as a special purpose computer system in which backup service 216 in computer system 212 enables backing up data such that the backup client stores data on a virtual storage system. Storing the data results in this data being sent to the backup service by the hypervisor that perceives the storage service as a storage system. In particular, backup service 216 and the presentation of backup service 216 as storage system 218 to virtual machine 210 transforms computer system 212 into a special purpose computer system as compared to currently available general computer systems that do not have backup service 216 presented as storage system 218 to hypervisor 220.

In the illustrative example, modifications to existing overlay architectures such as virtual networks and virtual machines are unnecessary. For example, changes to hypervisor 220, network virtualization layer 234, and storage virtualization layer 238 are unnecessary. Modifications to backup client 208 are also unnecessary. Backup client 208 can backup data 206 to virtualized storage system 222 using currently available backup techniques and methodologies.

Figure 3:
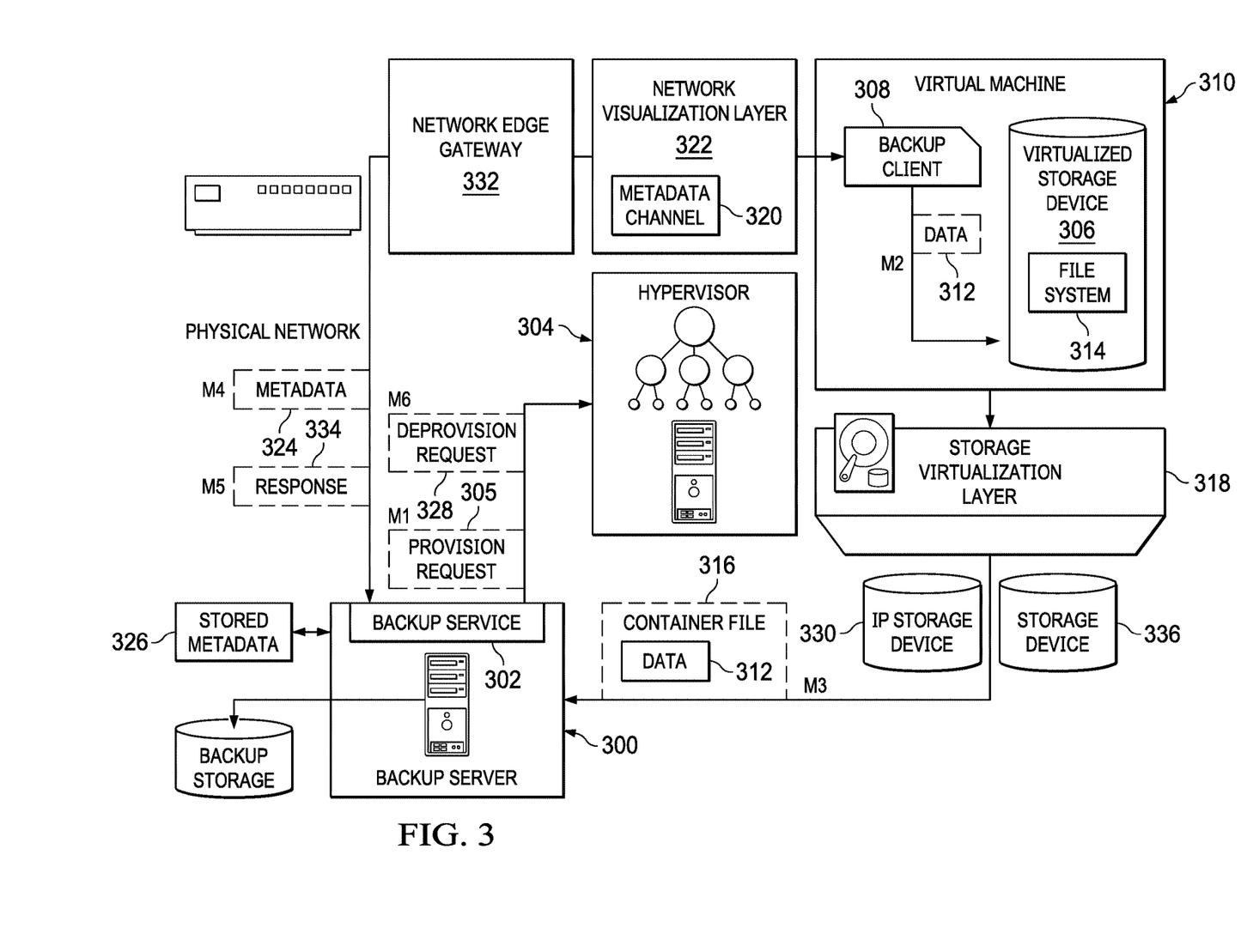
FIG. 3 is an illustration of a data flow diagram illustrating a flow of messages for creating a backup of data in a virtual machine in accordance with an illustrative embodiment.

With reference now to FIG. 3, an illustration of a data flow diagram illustrating a flow of messages for creating a backup of data in a virtual machine is depicted in accordance with an illustrative embodiment. In the illustrative examples, the same reference numeral may be used in more than one figure. This reuse of a reference numeral in different figures represents the same element in the different figures.

As depicted, the data flow for the backup process illustrated in this data flow diagram can be initiated based on a schedule for performing a backup or in response to requests from backup client 308 to perform a backup.

In this illustrative example, the backup process begins by backup server 300 establishing a connection with hypervisor 304. After establishing the connection, backup server 300 informs hypervisor 304 of a new disk. Backup service 302 is presented as IP storage device 330 to hypervisor 304.

Backup server 300 sends provision request 305 to hypervisor 304 to present virtualized storage device 306 to virtual machine 310 in which a backup is to be performed (m1). As depicted, backup client 308 issues operating system commands to mount virtualized storage device 306. File system 314 is created in virtualized storage device 306.

Backup client 308 writes data 312 to virtualized storage device 306 (m2). Data 312 can be placed in blocks in virtualized storage device 306. For example, the writing of data 312 can be performed using traditional writes via backup client 308 as a backup application, or backup client 308 can be an application that leverages the emerging native data format trends such that the data is written directly by the application.

As data 312 is written to virtualized storage device 306, hypervisor 304 receives data 312 from virtualized storage device 306. Hypervisor 304 places data 312 in container file 316 and sends container file 316 to backup service 302 through storage virtualization layer 318 (m3). The placing of data 312 into container file 316 and sending of container 316 using storage virtualization layer 318 is performed as if data 312 was being sent to a traditional storage device rather than backup service 302. Storage virtualization layer 318 is a currently used layer used by hypervisor 304 for storing data in traditional storage devices such as storage device 336.

Hypervisor 304 perceives backup service 302 as a storage device that was presented by backup server 300 when sending container file 316 to backup service 302. In other words, hypervisor 304 thinks container file 316 is being sent to a storage system. As depicted, container file 316 with data 312 for the backup is sent over storage virtualization layer 318 by hypervisor 304.

As the writing of data occurs, backup client 308 monitors the write placement on virtualized storage device 306 to establish where file boundaries exist and passing that information back to backup service 302 over metadata channel 320 in network virtualization layer 322 as metadata 324 (m4). With the use of network virtualization layer 322, metadata 324 passes through an edge device such as network edge gateway 332. Metadata 324 is stored in memory by backup service 302 as stored metadata 326 for use by backup service 302 in performing backup operations.

In the illustrative example, as incoming writes are received in container files from hypervisor 304, backup service 302 can perform a number of different tasks assuming that a number of writes are held in memory. In this illustrative example, writes can be blocked writes for blocks of data on a storage device.

For example, backup service 302 can examine incoming writes for data to determine whether the data has been previously received. If the data is unique, the data is processed for the backup operation. Otherwise, a pointer to the version of the data already present can be created. The version is the previously received data. In other words, backup service 302 can perform data deduplication on incoming writes of data to reduce the amount of data in the backup. Further, the data can be compressed to reduce the final size of the backup.

In the illustrative example, if backup client 308 encapsulates data 312 in a proprietary format, stored metadata 326 is updated by backup service 302 to reflect which blocks map to which files sent from backup client 308. Backup service 302 can also break up the incoming data stream into the encapsulated units normally used by backup client 308. If backup client 308 uses native data formats, then stored metadata 326 can be updated with block map 230 in FIG. 2 indicating where the files are stored.

With backup service 302 being presented as though it was a storage device with a file system in order, backup service 302 can avoid write errors by maintaining the file system metadata in stored metadata 326 in memory so that backup service 302 can perform actions such as updates to modified times, updates to last access times, respond to file listing requests, respond to directory listing requests, and handle subsequent file open requests during the backup operation by representing the file as having read/write permissions set. Maintaining file system metadata in stored metadata 326 can be particularly useful when backup clients use native tools and native data formats.

Further, backup service 302 can send response 334 to backup client 308 in response to an action performed (m5). For example, backup service 302 can send response 334 to each write issued by backup client 308 with the number of bytes written.

When the backup is completed, backup server 300 can send deprovision request 328 to deprovision virtualized storage device 306 and deprovision virtualized storage device 306 from storage virtualization layer 318 (m6). Backup server 300 can then halt presenting backup service 302 as IP storage device 330. In this manner, data 312 is stored as a backup that is consistent with currently performed backups.

Thus, the data flow depicted in FIG. 3 can occur without using traditional Internet protocol network-based data transfers such as those through network virtualization layer 234 in FIG. 2. By presenting backup service 302 as a storage device to hypervisor 304, virtualized storage device 306 can be presented within virtual machine 310 for performing backups using backup server 300. The data stored in virtualized storage device 306 is sent to backup service 302 by hypervisor 304 with hypervisor 304 believing that data 312 is being sent to a physical storage device instead of backup service 302. Further, this data flow also includes enabling the coordination of reads and writes between backup client 308 and backup service 302. In this illustrative example, metadata 324 includes information needed to identify block locations for files stored in virtualized storage device 306. Further, backup service 302 can also send responses in metadata sent back to backup client 308 to enable verification or confirmation of writes performed by backup client 308.

The architecture described in FIG. 2 and FIG. 3 does not have dependency on physical connectivity between the backup client in the backup services. Also, the dependencies are present for a specific shared file system in these illustrative examples.

The illustrations of backup environment 200 in FIG. 2 and the data flow depicted in FIG. 3 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, metadata has been described as flowing through a network virtualization layer through which data typically flows when communicating with software components outside of a virtual machine. In some illustrative examples, the metadata can be written to the virtual storage system such that the metadata is also sent to the backup service through a storage virtualization layer by the hypervisor.

As another example, one or more backup clients in addition to backup client 208 in FIG. 2 can perform backups by storing data to virtualized storage system 222 in virtual machine 210. In other illustrative examples, backup service 216 can be presented as more than one storage device such that multiple backup clients in the virtual machine can perform backups to separate virtualized storage systems. In still other illustrative examples, multiple backup services can be started by backup server 214 in which each backup service handles a backup for a particular backup client in virtual machine 210 in backup environment 200. In yet another illustrative example, backup service 216 can instruct hypervisor 220 for virtual machine 210 to present storage system 218 as virtualized storage system 222 to virtual machine 210 instead of having this process being performed by backup server 214.

Figure 4:
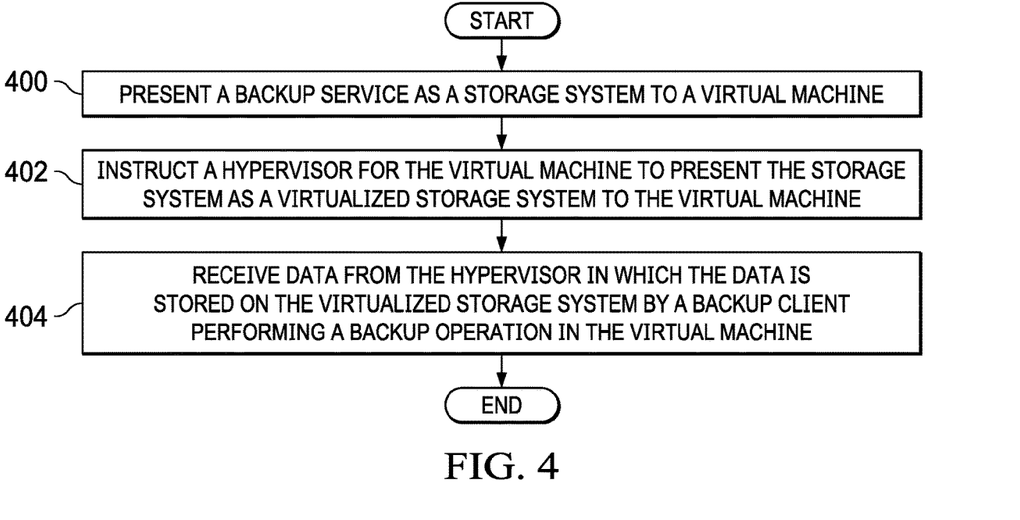
FIG. 4 is a flowchart of a process for backing up data from a virtual machine in accordance with an illustrative embodiment.

Turning next to FIG. 4, a flowchart of a process for backing up data from a virtual machine is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in backup service 216 in computer system 212 in FIG. 2.

The process begins by presenting a backup service as a storage system to a virtual machine (step 400). The storage system is located outside of the virtual machine.

The process instructs a hypervisor for the virtual machine to present the storage system as a virtualized storage system to the virtual machine (step 402). The process receives data from the hypervisor in which the data is stored on the virtualized storage system by a backup client performing a backup operation in the virtual machine (step 404). The process terminates thereafter.

Figure 5:
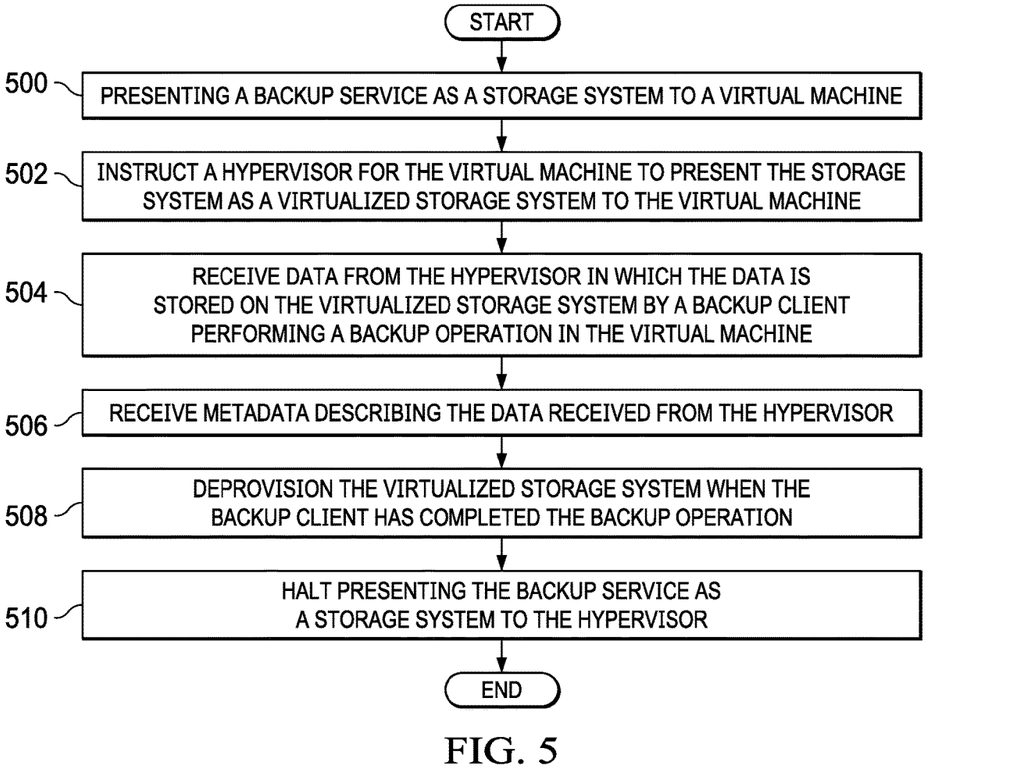
FIG. 5 is a more detailed flowchart of a process for backing up data from a virtual machine in accordance with an illustrative embodiment.

With reference to FIG. 5, a more detailed flowchart of a process for backing up data from a virtual machine is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in backup service 216 in computer system 212 in FIG. 2.

The process begins by presenting a backup service as a storage system to a virtual machine (step 500). The storage system is located outside of the virtual machine. The process instructs a hypervisor for the virtual machine to present the storage system as a virtualized storage system to the virtual machine (step 502).

The process receives data from the hypervisor in which the data is stored on the virtualized storage system by a backup client performing a backup operation in the virtual machine (step 504). The process receives metadata describing the data received from the hypervisor (step 506).

The process deprovisions the virtualized storage system when the backup client has completed the backup operation (step 508). The process halts presenting the backup service as a storage system to the hypervisor (step 510). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 6:
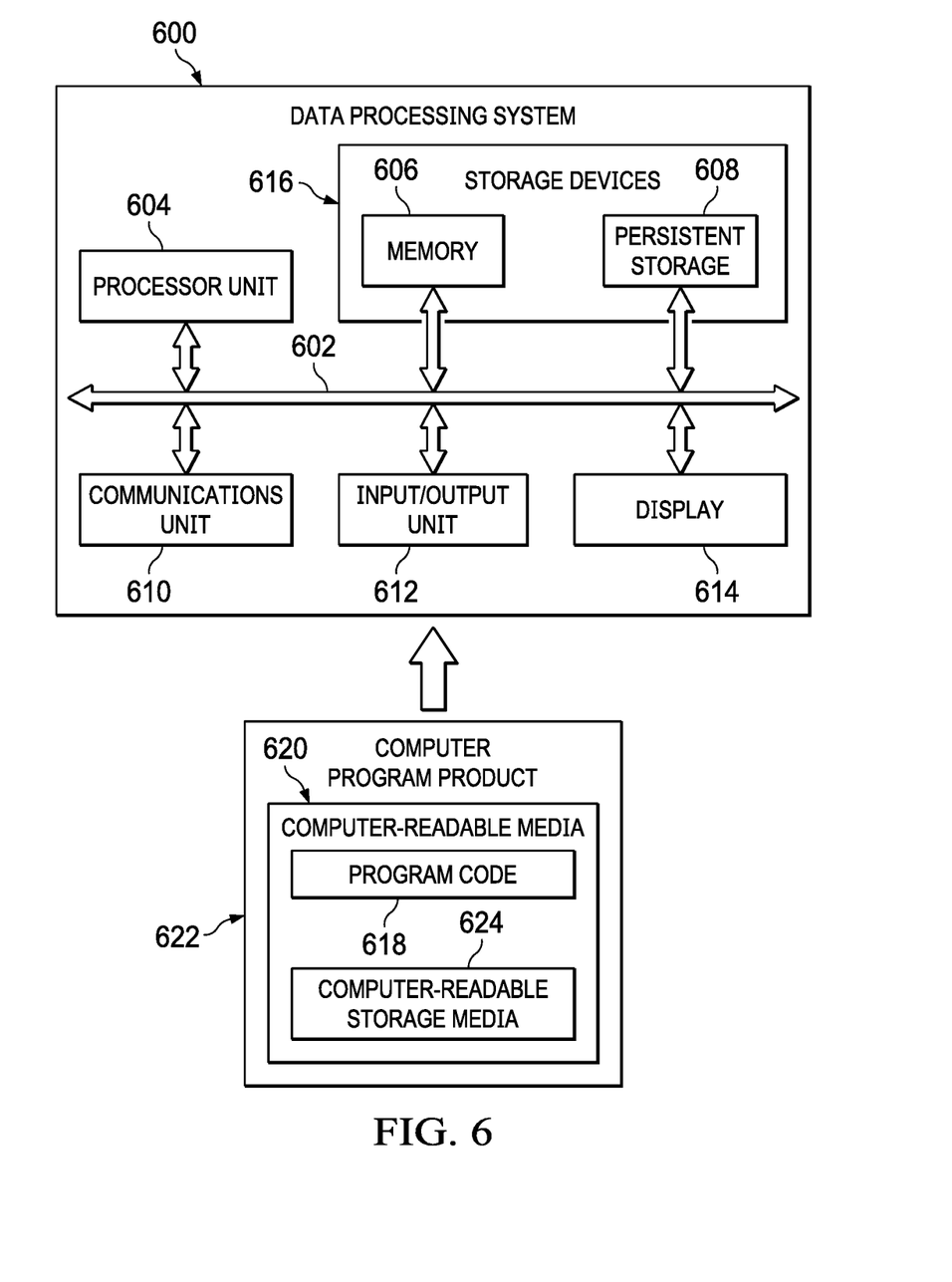
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement server computer 104, server computer 106, and client devices 110 in FIG. 1. Data processing system 600 can also be used to implement computer system 212 in FIG. 2. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 604 can may be implemented using one or more heterogeneous processor systems in which a main processor is present with secondary processors on a single chip. As another illustrative example, processor unit 604 can be a symmetric multi-processor system containing multiple processors of the same type on a single chip.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, can be, for example, a random-access memory or any other suitable volatile or non-volatile storage device. Persistent storage 608 may take various forms, depending on the particular implementation.

For example, persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program code, computer usable program code, or computer-readable program code that can be read and executed by a processor in processor unit 604. The program code in the different embodiments can be embodied on different physical or computer-readable storage media, such as memory 606 or persistent storage 608.

Program code 618 is located in a functional form on computer-readable media 620 that is selectively removable and can be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 can be transferred to data processing system 600 using a computer-readable signal media. The computer-readable signal media can be, for example, a propagated data signal containing program code 618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 600 are not meant to provide architectural limitations to the manner in which different embodiments can be implemented. In some illustrative examples, one or more of the components may be incorporated in or otherwise form a portion of another component. For example, memory 606, or portions thereof, may be incorporated in processor unit 604 in some illustrative examples. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program code 618.

Thus, the illustrative embodiments of the present invention provide a computer-implemented method, computer system, and computer program product for backing up data from a virtual machine. A backup service is presented by a computer system as a storage system to the virtual machine, wherein the storage system is located outside of the virtual machine. A hypervisor for the virtual machine is instructed by the computer system to present the storage system as a virtualized storage system to the virtual machine. Data is received by the computer system from the hypervisor in which the data is stored on the virtualized storage system by a backup client performing a backup operation in the virtual machine.

In the illustrative example, the data can be transferred from the backup client in the virtual machine to a backup server outside of the virtual machine without having to use a fundamentally different mechanism. In the illustrative example, edge devices, such as a network edge gateway, are not part of the data path sending data being backed up in the virtual machine. In the illustrative example, metadata can still pass through an edge device, allowing monitoring of the backup workload. Further, in the illustrative example, design modifications to the hypervisor are unnecessary.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for backing up data from a client computer running a virtual machine, the method comprising:
    presenting, by a backup server computer, a backup service as a storage system to a hypervisor associated with the virtual machine, wherein the storage system is located outside of the virtual machine and outside the client computer, wherein the backup server computer and the client computer are communicatively coupled by a network connection;
    instructing, by the backup server computer, the hypervisor to present the storage system as a virtualized storage system to the virtual machine; and
    receiving, by the backup server computer, data from the hypervisor in which the data is stored on the virtualized storage system by a backup client operable in the virtual machine on the client computer performing a backup operation in the virtual machine by writing to the virtualized storage system of the virtual machine,
    wherein the backup service is a computer program operable on the backup server computer outside of the hypervisor and outside of the virtual machine, and
    wherein the backup service is operable to mimic operation of the storage system.

2. The method of claim 1 further comprising:
    receiving, by the backup server computer, metadata describing the data received from the hypervisor.

3. The method of claim 2, wherein the metadata comprises at least one of a description of a file boundary, a modified time, a last access time, a file listing request, a directory listing request, or an open file request.

4. The method of claim 1 further comprising:
    maintaining, by the backup server computer, a metadata repository with the metadata, wherein the metadata repository includes a block map indicating a location of files in the virtualized storage system.

5. The method of claim 1 further comprising:
    deprovisioning, by the backup server computer, the virtualized storage system when the backup client has completed the backup operation.

6. The method of claim 1 further comprising:
    determining, by the backup server computer, whether the data received has been previously received;
    processing, by the backup server computer, the data for the backup operation in response to the data not being previously received; and
    creating, by the backup server computer, a pointer to previously received data when the data has been previously received.

7. The method of claim 1 further comprising:
    responding, by the backup server computer, to a write request for the data from the backup client with a number of bytes written.

8. The method of claim 1, wherein the storage system presented to the hypervisor is an Internet Protocol based storage device.

9. A backup system comprising:
    a backup server computer operable to:
        present a backup service as a storage system to a hypervisor associated with a virtual machine operating on a client computer, wherein the storage system is located outside of the virtual machine and outside the client computer, wherein the backup server computer and the client computer are communicatively coupled by a network connection;
        instruct the hypervisor to present the storage system as a virtualized storage system to the virtual machine; and
        receive data from the hypervisor in which the data is stored on the virtualized storage system by a backup client operable in the virtual machine on the client computer performing a backup operation in the virtual machine by writing to the virtualized storage system of the virtual machine,
        wherein the backup service is a computer program operable on the backup server computer outside of the hypervisor and outside of the virtual machine, and
        wherein the backup service is operable to mimic operation of the storage system.

10. The backup system of claim 9 wherein the backup server computer is further operable to:
    receive metadata describing the data received from the hypervisor.

11. The backup system of claim 10, wherein the metadata comprises at least one of a description of a file boundary, a modified time, a last access time, a file listing request, a directory listing request, or an open file request.

12. The backup system of claim 9, wherein the backup server computer is further operable to:
    maintain a metadata repository with the metadata, wherein the metadata repository includes a block map indicating a location of files in the virtualized storage system.

13. The backup system of claim 9, wherein the backup server computer is further operable to:
    deprovision the virtualized storage system when the backup client has completed the backup operation.

14. The backup system of claim 9, wherein the backup server computer is further operable to:
  determine whether the data received has been previously received;
  process the data for the backup operation in response to the data not being previously received; and
  create a pointer to previously received data when the data has been previously received.

15. The backup system of claim 9, wherein the backup server computer is further operable to:
  respond to a write request for the data from the backup client with a number of bytes written.

16. The backup system of claim 9, wherein the storage system presented to the hypervisor is an Internet Protocol based storage device.

17. A computer program product for backing up data from a client computer running a virtual machine, the computer program product comprising:
  a computer-readable storage media;
  first program code, stored on the computer-readable storage media, for presenting a backup service as a storage system to a hypervisor associated with the virtual machine, wherein the backup service and the storage system are located outside of the virtual machine and outside the client computer;
  second program code, stored on the computer-readable storage media, for instructing the hypervisor to present the storage system as a virtualized storage system to the virtual machine; and
  third program code, stored on the computer-readable storage media, for receiving data from the hypervisor in which the data is stored on the virtualized storage system by a backup client operable in the virtual machine on the client computer performing a backup operation in the virtual machine by writing to the virtualized storage system of the virtual machine,
  wherein the first program code, the second program code, and the third program code each comprise program instructions executable by a processor of a backup server,
  wherein the backup server is computer communicatively coupled to the client computer through a network,
  wherein the backup service is a computer program operable on the backup server computer outside of the virtual machine and outside of the client computer, and
  wherein the backup service is operable to mimic operation of the storage system.

18. The computer program product of claim 17 further comprising:
  fourth program code, stored on the computer-readable storage media, for receiving metadata describing the data received from the hypervisor, wherein the metadata comprises at least one of a description of a file boundary, a modified time, a last access time, a file listing request, a directory listing request, or an open file request,
  wherein the fourth program code comprises program instructions executable by a processor.

19. The computer program product of claim 17 further comprising:
  fourth program code, stored on the computer-readable storage media, for maintaining a metadata repository with the metadata, wherein the metadata repository includes a block map indicating a location of files in the virtualized storage system,
  wherein the fourth program code comprises program instructions executable by a processor.

20. The computer program product of claim 17 further comprising:
  fourth program code, stored on the computer-readable storage media, for deprovisioning the virtualized storage system when the backup client has completed the backup operation,
  wherein the fourth program code comprises program instructions executable by a processor.

* * * * *